(No Model.)

3 Sheets—Sheet 1.

G. F. FARRAR.
HORSE HAY RAKE.

No. 276,013.

Patented Apr. 17, 1883.

WITNESSES:
Fred. G. Dieterich.
J. G. Hunkell.

George F. Farrar
INVENTOR.
By Louis Bagger & ?
ATTORNEYS.

(No Model.)  3 Sheets—Sheet 2.

G. F. FARRAR.
HORSE HAY RAKE.

No. 276,013. Patented Apr. 17, 1883.

WITNESSES:
Fred. G. Dieterich
J. G. Hinkel

George F. Farrar,
INVENTOR.
By Louis Bagger & Co.
ATTORNEYS.

(No Model.) 3 Sheets—Sheet 3.

G. F. FARRAR.
HORSE HAY RAKE.

No. 276,013. Patented Apr. 17, 1883.

WITNESSES:
Fred. G. Dieterich
Wm. H. Secher

INVENTOR.
George F. Farrar,
By Louis Bagger & Co.
ATTORNEYS.

UNITED STATES PATENT OFFICE.

GEORGE F. FARRAR, OF HOOSICK FALLS, NEW YORK.

HORSE HAY-RAKE.

SPECIFICATION forming part of Letters Patent No. 276,013, dated April 17, 1883.

Application filed December 18, 1882. (No model.)

*To all whom it may concern:*

Be it known that I, GEORGE F. FARRAR, of Hoosick Falls, in the county of Rensselaer and State of New York, have invented certain new and useful Improvements in Horse Hay-Rakes; and I do hereby declare that the following is a full, clear, and exact description of the invention, which will enable others skilled in the art to which it appertains to make and use the same, reference being had to the accompanying drawings, which form a part of this specification, and in which—

Figure 1:
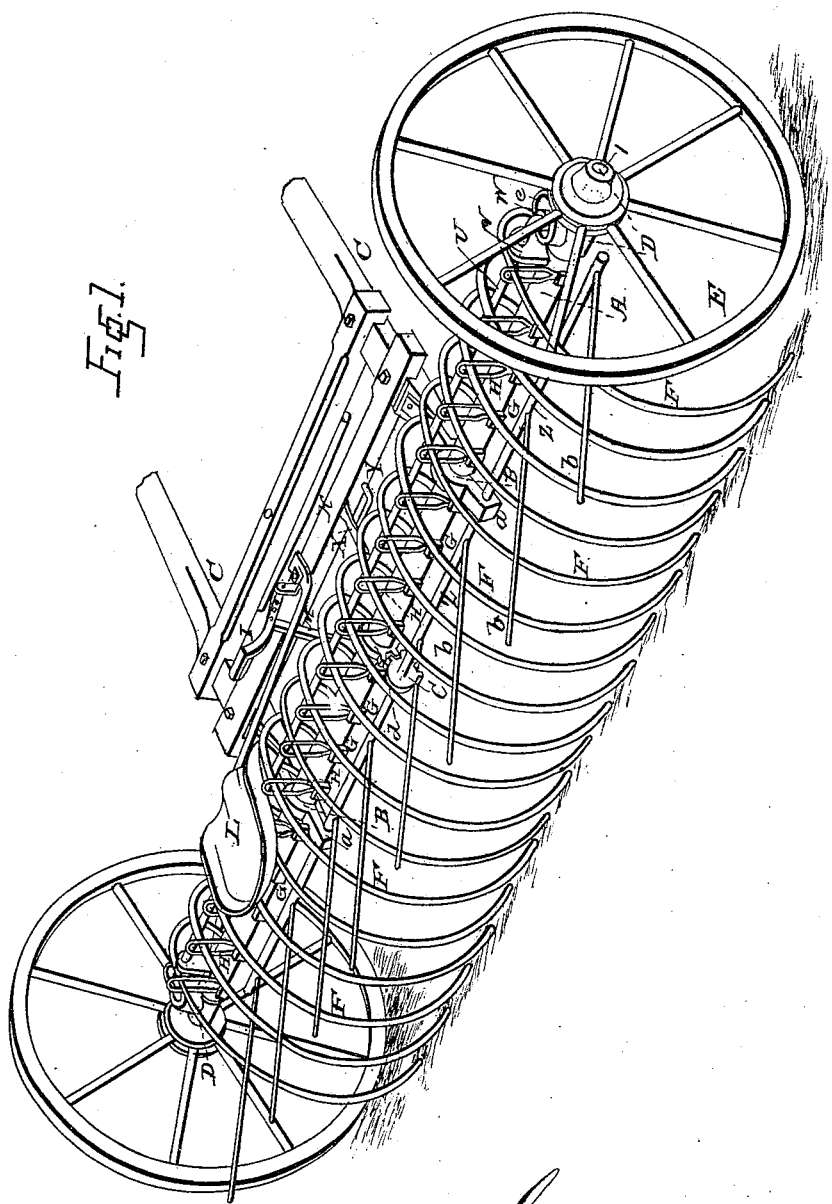
Figure 2:
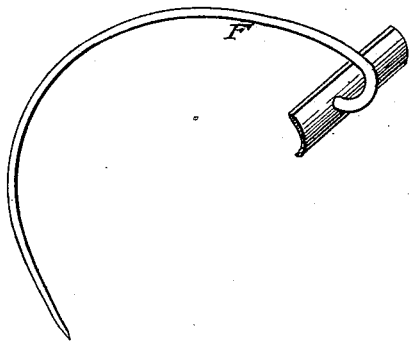
Figure 3:
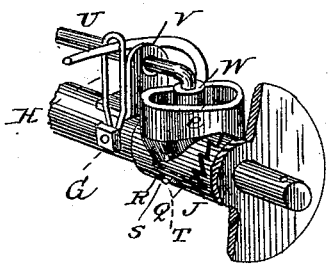
Figure 4:
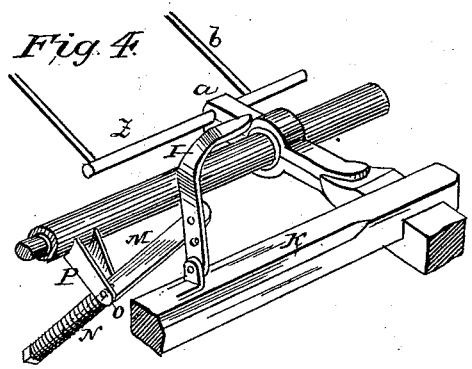
Figure 5:
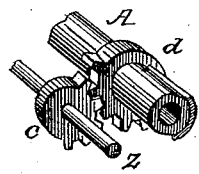
Figure 6:
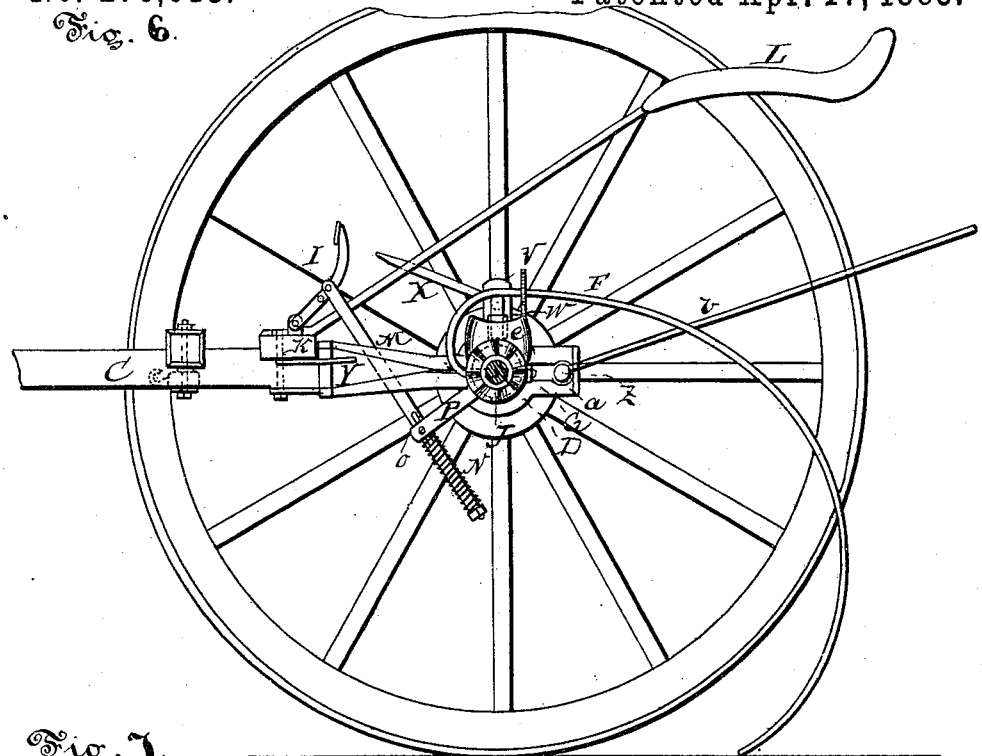
Figure 7:
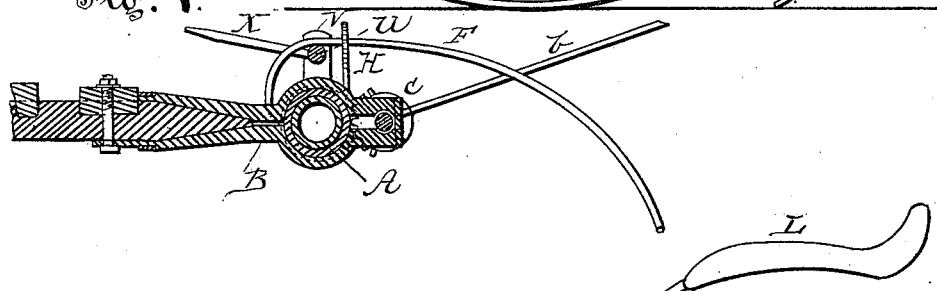
Figure 8:
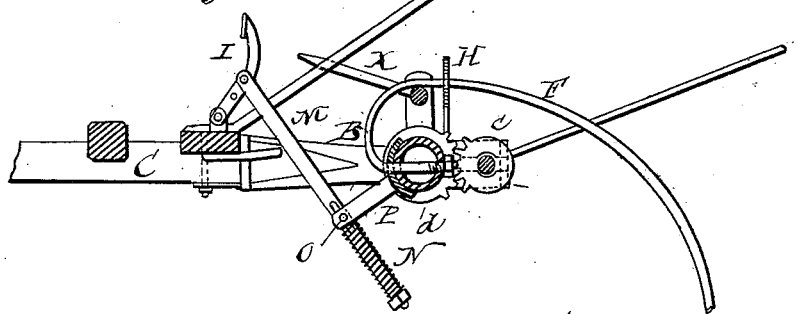

Figure 1 is a perspective view of my improved hay-rake. Fig. 2 is a detail view of a tooth; Fig. 3, a similar view of the tilting-clutch. Figs. 4 and 5 are detail views of the foot-lever and the cams operating the cleaning-fingers. Fig. 6 is an end view of the rake with one wheel removed. Fig. 7 is a cross-section of the rake-head at one of the bearings in the shafts; and Fig. 8 is a cross-section of the same, showing the foot-lever and clutch-operating lever in side view.

Similar letters of reference indicate corresponding parts in all the figures.

My invention has relation to horse hay-rakes; and it consists in the improved construction and combination of parts of the same, as hereinafter more fully shown and described.

In the accompanying drawings, the letter A indicates the rake-head, which is tubular and turns in bearings B upon the inner ends of the shafts C.

D indicates the spindles upon which the wheels E turn, and which are fastened in the ends of the tubular rake-head.

F are the rake-teeth, which are passed through the head and held by a nut, G, while the outer ends are bent over the rake-head and pass through a slotted plate or loop, H, which is fastened upon the end of the tooth by the nut G. The rake head and teeth are tilted either by means of a foot-lever, I, or by means of clutches J on the ends of the rake-head. The foot-lever I is pivoted upon the cross-bar K, near the driver's seat L, and has an arm, M, pivoted to it. The lower part of this arm is slotted and provided with a spiral spring, N, which is fastened at the lower end of the arm and bears against a pin, O, passing through the slot and fastened to the ends of two short arms, P, which extend from the rake-head. By depressing the lever I the rake is tilted, and the slotted arm M and spiral spring N allow the rake to yield to obstacles on the ground or to be tilted by the clutches J while the driver keeps his foot upon the lever. The clutches J are formed by ratchet-teeth Q on the inner edge of the hubs of the wheels, and similar teeth upon the edge of two sleeves, R, sliding upon the ends of the rake-head. These sleeves may be slid in and out upon the ends of the rake-head, while they turn with it when it is tilted, two pins or lugs, T, upon the side of the rake-head projecting through longitudinal slots S in the sleeves. The upper sides of the sleeves are provided with two narrow boxes, e, set obliquely to the longitudinal axis of the rake-head, converging toward the rear of the rake, into the open tops of which the down-turned ends of a rod, U, project, said ends being provided with rollers W. This rod U turns in bearings V upon the rake-head, and is operated by a lever or arm, X, projecting upward and forward from the rod near the driver's seat. It will be seen that when the arm X is depressed, turning rod U, the ends of the same and their rollers W, being turned rearward, slide the sleeves outward, pressing against the inward-facing sides of the boxes, and that the arm X will be tilted forward as the rake turns with the wheels, until its end touches a projection or bail, Y, upon the cross-piece K, which turns the ends of rod U and their rollers forward in the boxes, disengaging the clutch and allowing the rake-teeth to drop down, touching the ground.

Z is a bar turning in bearings a upon the inner ends of the shafts, and provided with fingers b, which project out between the rake-teeth. Upon the middle of this bar is fastened a cogged cam, c, which engages another cogged cam, d, upon the rake-head, so that when the rake-teeth are lifted the fingers are depressed, discharging the hay quickly without dragging it.

Having thus described my invention, I claim and desire to secure by Letters Patent of the United States—

1. In a horse hay-rake of the described class, the combination of the sleeves R, sliding longitudinally upon the ends of the rake-head, and having oblique boxes e upon their upper sides, with the rod U, oscillating in bearings V upon the rake-head, and having downward-bent outer ends provided with rollers W, and means for oscillating the rod, as and for the purpose shown and set forth.

2. In a horse hay-rake of the described class, the combination of the longitudinally-sliding sleeves R, having oblique boxes e upon their upper sides, rod U, journaled over the rake-head, and having downward-bent outer ends provided with rollers W, and forward and upward projecting arm X, and the bail or projection Y, fastened upon the cross-piece K of the shafts, as and for the purpose shown and set forth.

3. As an improvement in horse hay-rakes, the combination and arrangement of the rake comprising the axle, the longitudinally-sliding sleeves R e, ratchet-toothed wheels E Q, oscillating rod U, mounted in journals on the sleeves, and having rollers W and arm X, and bail or projection Y, all constructed to operate as and for the purpose shown and set forth.

In testimony that I claim the foregoing as my own I have hereunto affixed my signature in presence of two witnesses.

GEORGE FRED FARRAR.

Witnesses:
 GEO. MAXON LAMB,
 J. H. BROWN.